United States Patent [19]

De With

[11] Patent Number: 4,953,020

[45] Date of Patent: Aug. 28, 1990

[54] TELEVISION TRANSMISSION SYSTEM WITH DIFFERENTIAL ENCODING OF TRANSFORM COEFFICIENTS

[75] Inventor: Peter H. N. De With, Eindhoven, Netherlands

[73] Assignee: U.S. Philips Corporation, New York, N.Y.

[21] Appl. No.: 339,551

[22] Filed: Apr. 17, 1989

[30] Foreign Application Priority Data

May 9, 1988 [NL] Netherlands .................. 8801207

[51] Int. Cl.$^5$ ............................................. H04N 7/133
[52] U.S. Cl. .................................... 358/133; 358/135
[58] Field of Search ............... 358/133, 135, 136, 138

[56] References Cited

U.S. PATENT DOCUMENTS 4,831,440  5/1989  Borgers ............................. 358/133
4,833,535  5/1989  Ozeki ................................. 358/135

Primary Examiner—Howard W. Britton
Attorney, Agent, or Firm—Michael E. Marion

[57] ABSTRACT

In a television transmission system for digital picture signals each picture is divided into sub-pictures of $N \times N$ picture elements for the purpose of limiting the bit rate. Each sub-picture is subjected to a two-dimensional forward transform to determine coefficients. These coefficients are converted into a series of serially occurring coefficients in which the AC coefficients in this series are arranged in such a way that the magnitude variation of these AC coefficients in the series is monotonous. The magnitudes of the AC coefficients thus arranged are subjected to a differential encoding so that the difference between the magnitudes of two successive AC coefficients is transmitted instead of the magnitude of the AC coefficients themselves.

5 Claims, 6 Drawing Sheets

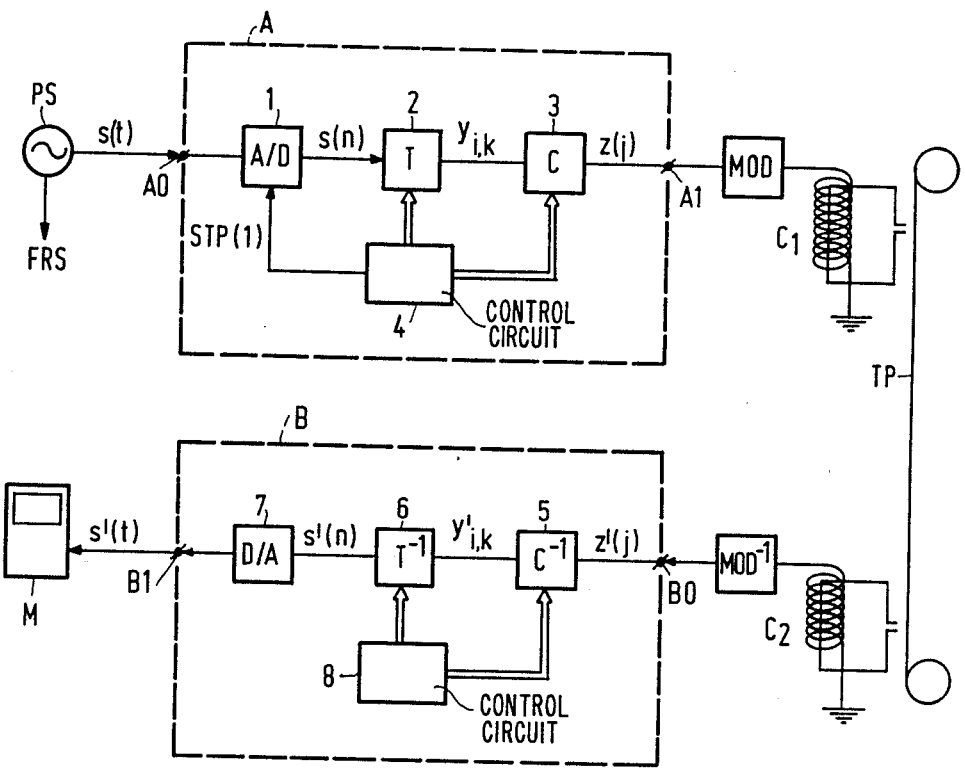
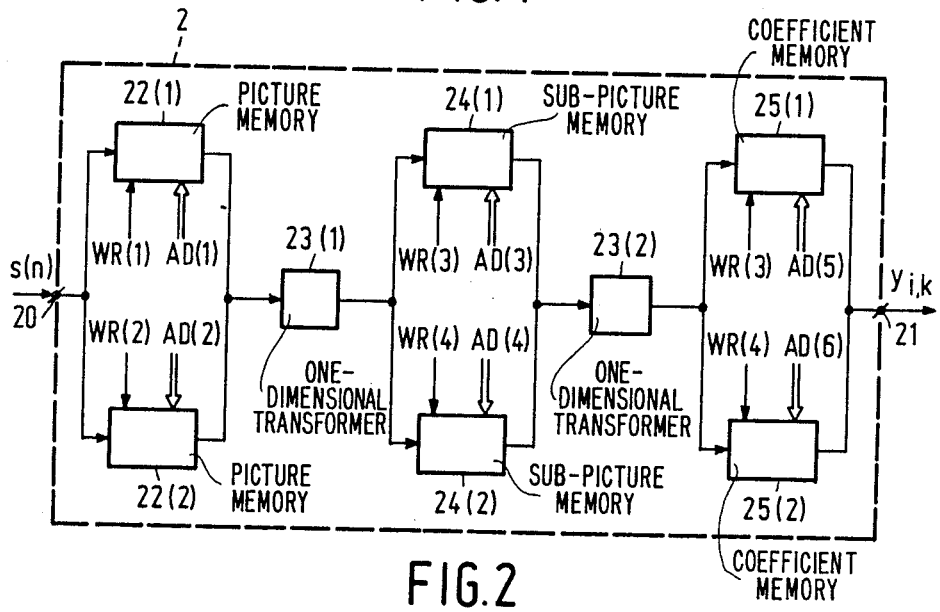
FIG. 1
FIG. 2

$y_{00}$ $y_{01}$ $y_{10}$ $y_{20}$ $y_{11}$ $y_{02}$ $y_{03}$ $y_{12}$ $y_{21}$ $y_{30}$ $y_{40}$ .... $y_{75}$ $y_{66}$ $y_{57}$ $y_{67}$ $y_{76}$ $y_{77}$

TELEVISION TRANSMISSION SYSTEM WITH DIFFERENTIAL ENCODING OF TRANSFORM COEFFICIENTS

BACKGROUND OF THE INVENTION (1) Field of the Invention

The invention generally relates to a television system for transmitting a picture signal is a digital format via a transmission medium from an encoding station to a decoding station.

More particularly the invention relates to a television system of the type in which picture transform coding is used.

Such a television system may form part of a television broadcasting system, in which case the encoding station forms part of the television broadcasting transmitter and each TV receiver is provided with a decoding station. The transmission medium is the atmosphere in this case.

Such a television system may also form part of a video recorder, in which case the transmission medium is the video tape.

(2) Description of the Prior Art

As is generally known, a picture can be considered to be a two-dimensional array of $M \times N$ picture elements. If these picture elements are encoded independently of one another, such an array is referred to as the canonical picture. In a 625-line TV picture the visible part of the picture comprises 576 lines and each line comprises 720 picture elements. If the brightness of each picture element is represented, for example, by 8 bits, approximately $3.10^6$ bits are required for the representation of the brightness of this canonical picture, which involves a bit rate of approximately $75.10^6$ bits/sec for 25 pictures per second. In practice, this is found to be inadmissibly high. By subjecting the canonical picture to a two-dimensional transform, the number of bits per picture and hence the bit rate can be reduced considerably.

For performing such a transform the picture is divided into sub-pictures of $N \times N$ picture elements each. Each sub-picture is subsequently converted by means of a two-dimensional transform into an array of $N \times N$ coefficients. The transform has for its purpose to obtain an array of coefficients which are mutually uncorrelated. In how far this object is achieved is closely related to the transformation chosen. In this connection the Karhunen-Loeve transform (see, for example Reference 1, pp. 259–264) is found to be optimum. However, this transform method cannot easily be implemented. Nowadays the discrete cosine transform (DCT) is generally considered to be the best alternative (see Reference 2).

The physical significance of this two-dimensional transform is the following. Each sub-picture is considered as a sum of $N^2$ mutually orthogonal basic picture $B_{i,k}$ each also consisting of $N \times N$ picture elements and each with its own weighting factor $y_{i,k}$; $i,k=0, 1, 2, \ldots N-1$. It is these weighting factors which are obtained by the two-dimensional transform. As is common practice, they will hereinafter be referred to as coefficients. Of the said basic pictures $B_{0,0}$ is representative of the average brightness of the sub-picture. Therefore, $y_{0,0}$ is referred to as the DC coefficient. In contrast thereto the other coefficients are usually referred to as AC coefficients.

A reduction of the number of bits to be transmitted per picture is now realized by transmitting only those AC coefficients whose absolute values are larger than a given threshold value. This is known as "threshold sampling" (see page 813 of Reference 3). Unfortunately it must be specified which coefficients are transmitted. This is effected, for example by transmitting of each coefficient to be transmitted the address of the location which it has in the coefficient array. For this purpose more extra bits are required and the bit rate reduction is less impressive. It is to be noted that the DC coefficient is always transmitted.

To realize a further reduction of the bit rate reduction, Reference 4 proposes to arrange the AC coefficients of a coefficient array in the order of decreasing magnitude and to transcode each AC coefficient in a transmission word of variable length, which is dependent on the magnitude of the AC coefficient on the one hand and on its ordinal number in the array on the other hand.

OBJECT AND SUMMARY OF THE INVENTION

It is an object of the invention to realize a further bit rate reduction.

According to the invention the magnitudes of the AC coefficients of a coefficient array arranged generally in their order of monotonously varying magnitude are subjected to a differential encoding.

In this manner each original AC coefficient is converted into what will be referred to as difference coefficients. Since the AC coefficients are arranged in a monotonously varying array, the difference coefficients will generally be small. Thus a small number of bits will be required for their digital representation.

According to a further elaboration of the invention the difference coefficients are recoded into transmission words of variable length, which recoding is based on a fixed recoding table in which the word length of the transmission word is exclusively dependent on the magnitude of the difference coefficient and decreases with a decreasing magnitude of the difference coefficient.

REFERENCES

1. Digital Image Processing; W. K. Pratt; John Wiley and Sons.
2. Scene Adaptive Coder; W. H. Chen, W. K. Pratt; IEEE Transactions on Communications, Vol. COM-32, No. 3, Mar. 1984, pages 225–232.
3. Transform Picture Coding; P. A. Wintz; Proceedings of the IEEE, Vol. 60, No. 7, Jul. 1972, pages 809–820.
4. Verfahren zur digitalen Nachrichtenubertragung; H. W. Keesen, G. Oberjatzas, H. Peters; European Patent Application no. 0,197,527.
5. Discrete Cosine Transform Arrangement; S. M. C. Borgers, C. P. Visser; European Patent Application no. 0,245,903.

EXPLANATION OF THE INVENTION

BRIEF DESCRIPTION OF THE FIGURES

FIG. 1 shows diagrammatically a video recorder provided with the television system according to the invention;

FIG. 2 shows a transform circuit for use in the television system of FIG. 1;

GENERAL STRUCTURE OF THE TELEVISION SYSTEM

Figures 3, 4, 5:
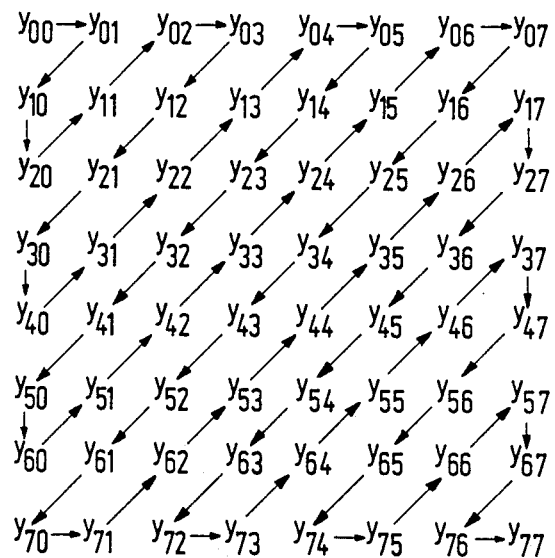
FIGS. 3, 4 and 5 show some diagrams to explain the operation of the transform circuit of FIG. 2.

FIG. 1 shows diagrammatically a video recorder provided with the television system according to the invention. This television system comprises an encoding station A and a decoding station B. The encoding station A has an input A0 for receiving picture signals s(t) which are supplied by a picture signal source PS, for example a video camera. The output A1 of this encoding station is connected via a modulation circuit MOD to a write-head C1 by means of which the processed analog picture signal s(t) can be registered on a magnetic tape TP. To regain the original picture signal, the input B0 of the decoding station is connected to a read-head C2 via a demodulation circuit MOD$^{-1}$. This read-head converts the information on the magnetic tape into electric signals. An output B1 of this decoding station B supplies an analog picture signal s'(t) which can be applied to a monitor M.

In the encoding station A the analog picture signal s(t) is sampled in an analog-to-digital converter 1 at a suitably chosen sampling frequency $f_s$ of, for example 13.5 MHz and the picture signal samples thus obtained, commonly referred to as picture elements, are encoded into, for example 8-bit PCM words s(n). These amplitude discrete picture elements are subsequently applied to a transform circuit 2 for performing a forward two-dimensional transform, for example a Discrete Cosine Transform. Many examples of such a transformer are described in literature (see for example Reference 5), but the general structure will be described in greater detail. In general, it divides the picture elements of a television picture into sub-pictures of N×N picture elements each and transforms each sub-picture into an array of N×N coefficients. A typical value of N is, for example eight. The coefficients of such an array will hereinafter be referred to as $y_{i,k}$ in which i,k=0, 1, 2, . . . N−1. The coefficients thus obtained are applied to an encoding circuit 3 whose structure will be described in greater detail. It is adapted to convert each array of N×N coefficients, with a total of $8N^2$ bits in this embodiment, into a block of transmission words of variable length having a total number which is considerably less than these $8N^2$ bits. In FIG. 1 such a transmission word is denoted by z(j). The bits in these transmission words are applied via the modulator circuit MOD to the write-head C1 and registered on the magnetic tape. For the control of the different circuits in the encoding station A a control circuit 4 is provided which supplies inter alia the sampling pulses for the analog-to-digital converter 1.

In the decoding station B the signal supplied by the read-head C2 is converted in a demodulator circuit MOD$^{-1}$ into blocks of transmission words which correspond to the blocks of transmission words applied in the encoding station A to the modulator circuit MOD. In FIG. 1 the transmission words supplied by the demodulator circuit MOD$^{-1}$ are denoted by z'(j). These blocks of transmission words are in their turn applied to a decoding circuit 5 which converts a block of transmission words into an array of coefficients y'$_{i,k}$. This array is in turn applied to a transform circuit 6 for performing an inverse two-dimensional transform (in this case an inverse Discrete Cosine Transform) so that each array of coefficients is converted into an array of picture elements which are successively applied as picture signal samples s'(n) to a digital-to-analog converter so that the analog picture signal s'(t) is obtained which can be displayed on the monitor M and which corresponds to the picture signal s(t) which is supplied by the picture signal source PS. A control circuit 8 is present in this decoding station B for controlling the different circuits.

It is to be noted that in this embodiment the picture signal source PS supplies a frame reset pulse FRS each time at the end of a complete picture, which pulse can be used for different purposes.

THE TRANSFORM CIRCUIT

As described in the foregoing, the transform circuit 2 is adapted to subject sub-pictures of N×N picture elements to a two-dimensional transform, for example discrete cosine transform. An embodiment of such a transform circuit is shown diagrammatically in FIG. 2. It has an input 20 to which the picture element s(n) are applied and an output 21 at which the coefficients $y_{i,k}$ occur. Two picture memories 22(1) and 22(2) are connected to the input 20. They are provided with addressable memory locations and are controlled by write/read commands WR(1) and WR(2) in such a way that, for example the visible picture elements of the visible lines of two successive fields of a picture are written in one of them, while simultaneously the visible picture elements of the visible of the two fields of the previous picture and those stored in the other picture memory are read. The address words AD(1), AD(2) applied to the address inputs of these picture memories determine at which location in the memory a picture element is stored, or which picture element is read.

More particularly, received visible picture elements of visible picture lines are written line by line in the picture memory. Firstly the picture elements of the odd lines, then those of the even lines. After all visible picture elements of a picture are written in the picture memory it comprises, for example the picture elements illustrated by means of dots in FIG. 3. In this FIG. 3 the row numbers LN of the picture memory in which visible picture elements are written are plotted in the vertical direction and the column numbers PN of the picture memory in which visible picture elements are written are plotted in the horizontal direction. On reading the contents of the picture memory each picture is divided into sub-pictures of N×N picture elements. Such a division is shown diagrammatically in FIG. 3 for N=8. A sub-picture will hereinafter be referred to by X and a picture element thereof will be referred to by $x_{i,k}$.

The picture elements of such a sub-picture are applied row by row to a one-dimensional transformer 23(1). In this transformer the sub-picture X is multiplied by the fixed transform matrix X which in this case is also an 8×8 matrix, for example an 8×8 discrete cosine transform matrix (abbreviated DCT matrix). Thus the 8×8 product matrix P=XA is obtained which consists of the elements $p_{i,k}$.

Two sub-picture memories 24(.) are connected to the output of this one-dimensional transformer 23(1). Similarly as the picture memories 22(.) they are provided with addressable memory locations and are controlled by write/read commands WR(3) and WR(4) in such a way that the elements of the product matrix P are written in one of them, while the elements of the previous product matrix P stored in the other memory are read. More particularly the elements $p_{i,k}$ are written row by row in such a memory and read column by column, thus obtaining the transposed product matrix $P^T$. The address words AD(3) and AD(4) applied to the address inputs determine in which memory location a product element is stored or which product element is read.

The outputs of the sub-picture memories 24(.) are connected to the input of a further one-dimensional transformer 23(2) in which the transposed product matrix $P^T$ is multiplied by the said transform matrix A. The desired coefficient matrix Y consisting of the coefficients $y_{i,k}$ is then obtained. These coefficients are written in one of the two coefficient memories 25(.) each comprising $N \times N$ (=$8 \times 8$ in this embodiment) memory locations which can be addressed by means of address words AD(5) and AD(6) applied to their address inputs. Furthermore they are controlled by the write/read commands WR(3) and WR(4) in such a way that coefficients $y_{i,k}$ are written in one of the two memories, namely row by row, while the coefficients of the previous coefficient matrix Y stored in the other memory are read in a predetermined sequence so that the coefficients $y_{i,k}$ appear at the output 21 in a given sequence. This is shown in greater detail in FIGS. 4 and 5. More particularly, FIG. 4 shows the coefficient matrix Y with the coefficients $y_{i,k}$. The arrows in this FIG. 4 indicate that this matrix is scanned in a zigzag way for reading the coefficients. Consequently the coefficients occur at the output 21 of the transform circuit in the sequence as is shown in FIG. 5.

THE CONTROL CIRCUIT

Figure 6:
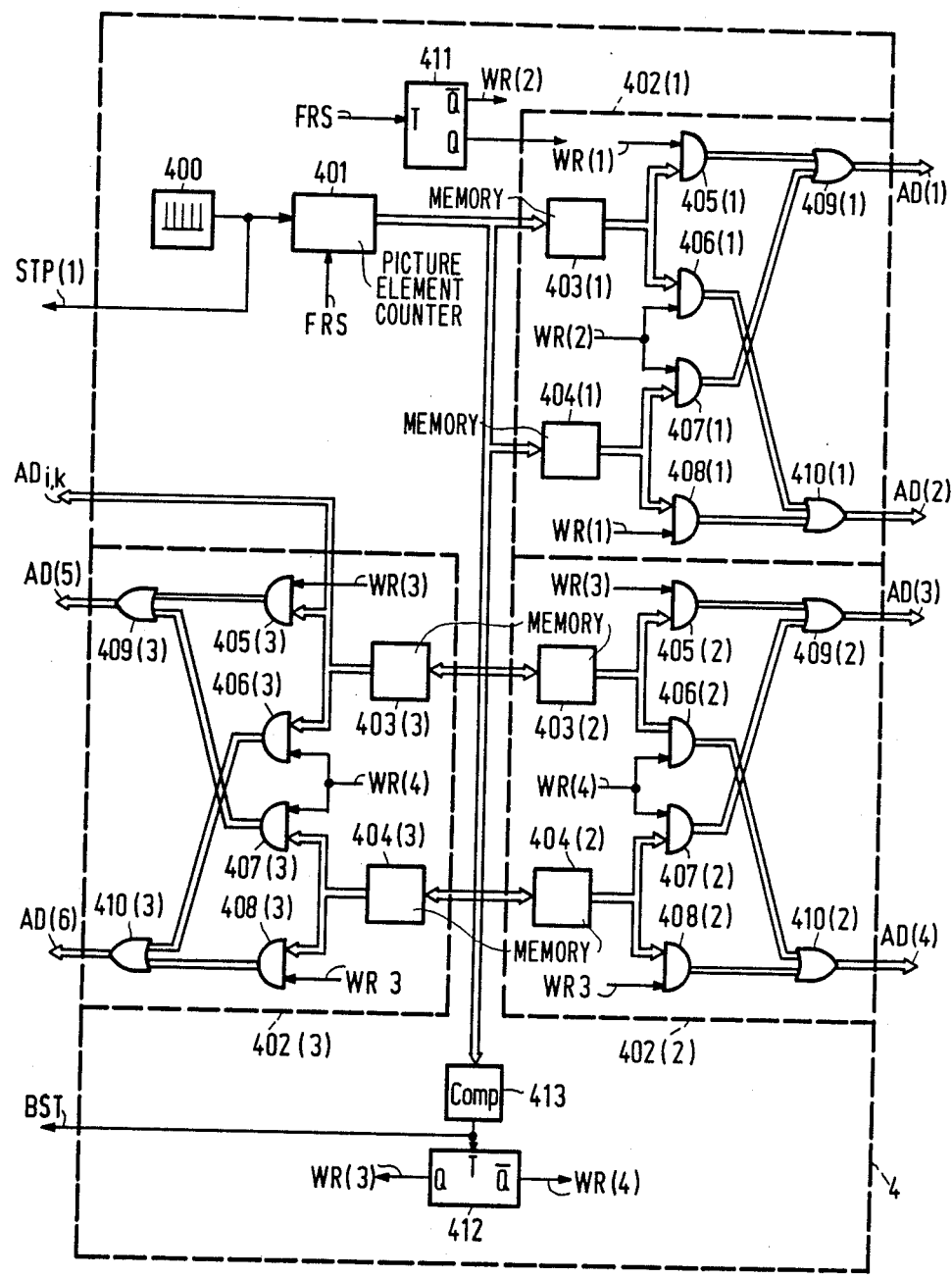
FIG. 6 shows a control circuit for use in the television system of FIG. 1.

As has been noted in section D(2), the different circuits of the encoding station A are controlled by a control circuit 4. An embodiment thereof is shown in FIG. 6 for the sake of completeness. It comprises a clock generator 400 which supplies clock pulses at a rate $f_s$. They are applied as sampling pulses to the analog-to-digital converter 1 (see FIG. 1) and to a picture element counter 401 whose count ranges from zero to a number which is equal to the number of picture elements constituting a complete picture. At the beginning of each new picture this counter is reset by the frame reset pulse FRS which is supplied by the video signal source PS (see FIG. 1). This control circuit also comprises three logic circuits 402(.) which have a similar structure. They comprise two memories 403(.) and 404(.) which are each in the form of a ROM and to which the counts of the picture element counter 401 are applied as addresses. More particularly the ROMs 403(1), 403(2) and 403(3) supply read addresses for the respective memories 22(.), 24(.) and 25(.) of the transform circuit shown in FIG. 2. Read addresses determine the sequence in which quantities are read from the addressed memory. The ROMs 404(.) supply the write addresses for the said memories of the transform circuit. These determine in which memory location of the memory thus addressed a quantity is written.

The addresses supplied by the ROMs 403(.) 404(.) are combined to the address words AD(.) by means of AND-gate circuits 405(.), 406(.), 407(.), 408(.) and OR-gate circuits 409(.) and 410(.). To achieve that a memory of the transform circuit alternately receives read addresses and write addresses, a T flip-flop 411 is provided which receives the frame reset pulses FRS. In response thereto it supplies the write/read command WR(1) at its Q output and the write/read command WR(2) at its $\overline{Q}$ output. These commands are applied in the manner shown to the AND-gate circuits of the logic circuit 402(1). On the other hand a T flip-flop 412 is provided whose Q output supplies the write/read commands WR(3) and the $\overline{Q}$ output supplies the write/read commands WR(4). These commands are applied in the manner shown to the AND-gate circuits of the logic circuits 402(2) and 402(3). This T flip-flop 412 is controlled by pulses which are supplied by a comparator circuit 413. This circuit receives the counts of the picture element counter 401 and supplies a pulse whenever the count of picture element counter 401 corresponds to predetermined counts each characterizing the first picture element of a sub-picture.

It is to be noted that the read addresses supplied by the ROM 403(3) and determining the sequence shown in FIG. 4 in which the coefficients are read from the coefficient memory 25(.) are separately derived from the control circuit. The address associated with the coefficient $y_{i,k}$ will hereinafter be denoted by $AD_{i,k}$.

It is also to be noted that the pulses supplied by the comparator circuit 413 as block start pulses, denoted BST, are also separately derived from the control circuit.

THE ENCODING CIRCUIT 3

Figure 7:
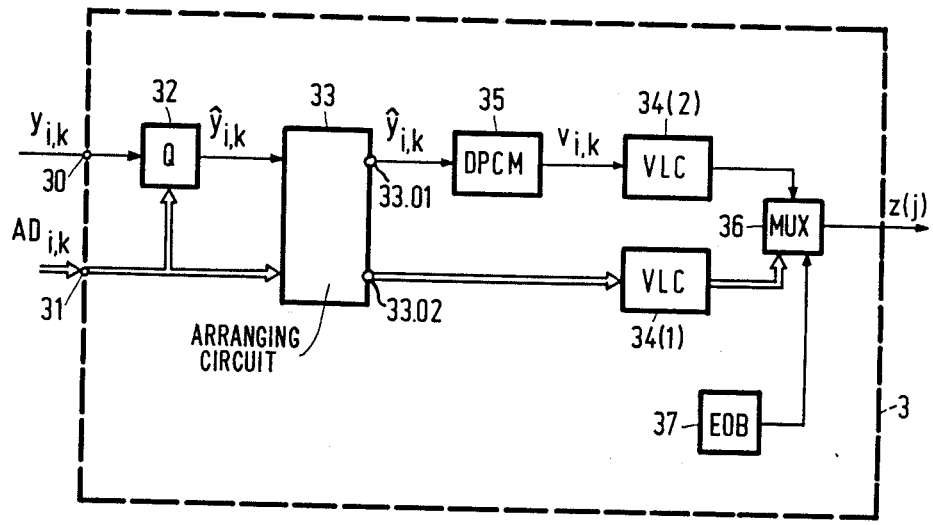
FIG. 7 shows an encoding circuit for use in the television system of FIG. 1.

The general structure of the encoding circuit 3 of FIG. 1 is shown in FIG. 7. It has an input 30 at which the coefficients $y_{i,k}$ occur and an input 31 at which each time the address word $AD_{i,k}$ associated with the relevant coefficient $y_{i,k}$ and supplied by the control circuit 4 (see FIG. 6) occurs. The coefficients $y_{i,k}$ are applied to a quantizing circuit 33 which converts each coefficient into a quantized coefficient $\hat{y}_{i,k}$. Quantizing circuits which are suitable for this purpose are generally known. In the embodiment shown it is assumed that this quantizing circuit is of a type in which the quantization step size is dependent on the location of the coefficient to be quantized in the coefficient array. Therefore the address word $AD_{i,k}$ associated with the relevant coefficient is also applied to this quantizing circuit.

The quantized coefficients $\hat{y}_{i,k}$ thus obtained in a coefficient array are applied with their associated address words $AD_{i,k}$ to an arranging circuit 33 whose structure will be described in greater detail. In this respect it is to be noted that its output 33.01 firstly supplies the quantized DC coefficient $\hat{y}_{o,o}$ of each array of coefficients and subsequently, in the sequence of monotonously varying magnitude, for example, in the sequence of decreasing magnitude, the quantized AC coefficients $\hat{y}_{i,k}$ which are different from zero. Simultaneously with a quantized coefficient $\hat{y}_{i,k}$ at the output 33.01, the address word $AD_{i,k}$ associated with this coefficient occurs at a further output 33.02 of this arranging circuit 33. These address words are subsequently applied for variable length encoding to a variable length-encoding circuit 34(1) which converts each address word $AD_{i,k}$ into a variable length address word $VL(AD_{i,k})$ whose length is dependent on the value of the original address word.

The quantized coefficients $\hat{y}_{i,k}$ monotonously decreasing an amplitude and being different from zero, which occur at the output 33.01 of the arranging circuit 33, are applied to a differential encoding circuit 35. This circuit each time converts the difference in magnitude of two successive quantized coefficients into a difference coefficient $v_{i,k}$. These difference coefficients are also applied to a variable length-encoding circuit 34(2) which converts each difference coefficient $v_{i,k}$ into a variable length difference coefficient $VL(v_{i,k})$ whose length is dependent on the magnitude of the difference coefficient. The variable length address words $VL(AD_{i,k})$ and the associated variable length difference coefficients $VL(v_{i,k})$ are applied to a multiplexer circuit 36 alternately supplying a variable length difference code word $VL(v_{i,k})$ and the associated variable length address word $VL(AD_{i,k})$. In this embodiment this multiplexer circuit also supplies a code word EOB (end-of-block) which indicates that the multiplexer circuit has supplied all variable length difference coefficients with their associated variable length address words of an array of coefficients. This code word EOB is supplied by a source 37.

Figure 8:
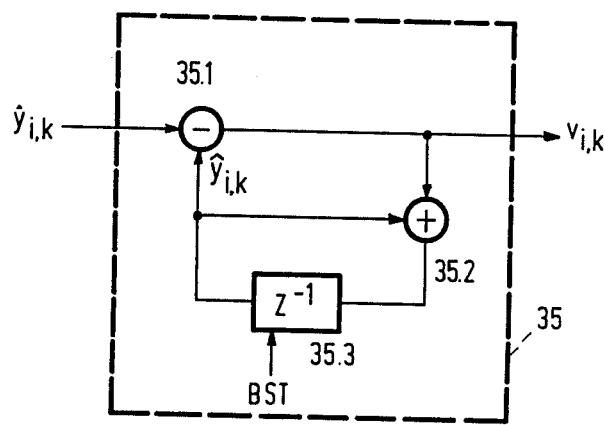
FIG. 8 shows a circuit for performing a differential encoding for use in the encoding circuit of FIG. 7.

The differential encoding circuit 35 may have many forms. One embodiment is shown in FIG. 8 for the sake of completeness. It comprises a difference producer 35.1 which receives the series of quantized coefficients $\hat{y}_{i,k}$ monotonously decreasing in magnitude and which receives for each of these coefficients the coefficient preceding it in the series and now being denoted by $\bar{y}_{i,k}$. This producer now supplies the said difference coefficient $v_{i,k} = \bar{y}_{i,k} - \hat{y}_{i,k}$. The coefficient $\bar{y}_{i,k}$ is obtained in this embodiment by accumulation of all difference coefficients $v_{i,k}$. To this end an adder circuit 35.2 is provided which receives $v_{i,k}$ and $\bar{y}_{i,k}$ and which stores their sum temporarily in a memory 35.3. It is to be noted that this memory is each time reset by the block start signal BST. This is done to prevent the encoding of the coefficients of an actual array being influenced by the encoding of the coefficients of a previous array.

Figure 9:
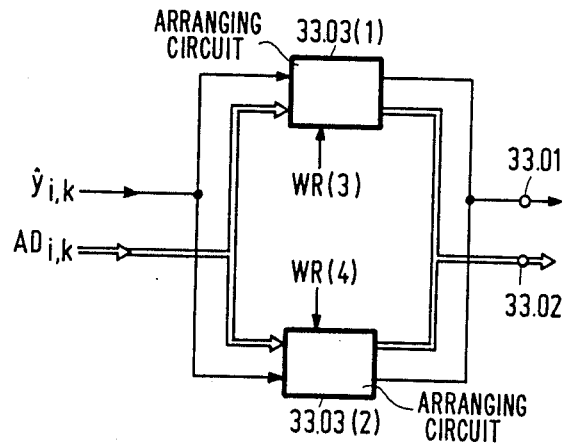
FIG. 9 shows an arranging circuit for use in the encoding circuit of FIG. 7.
Figure 10:
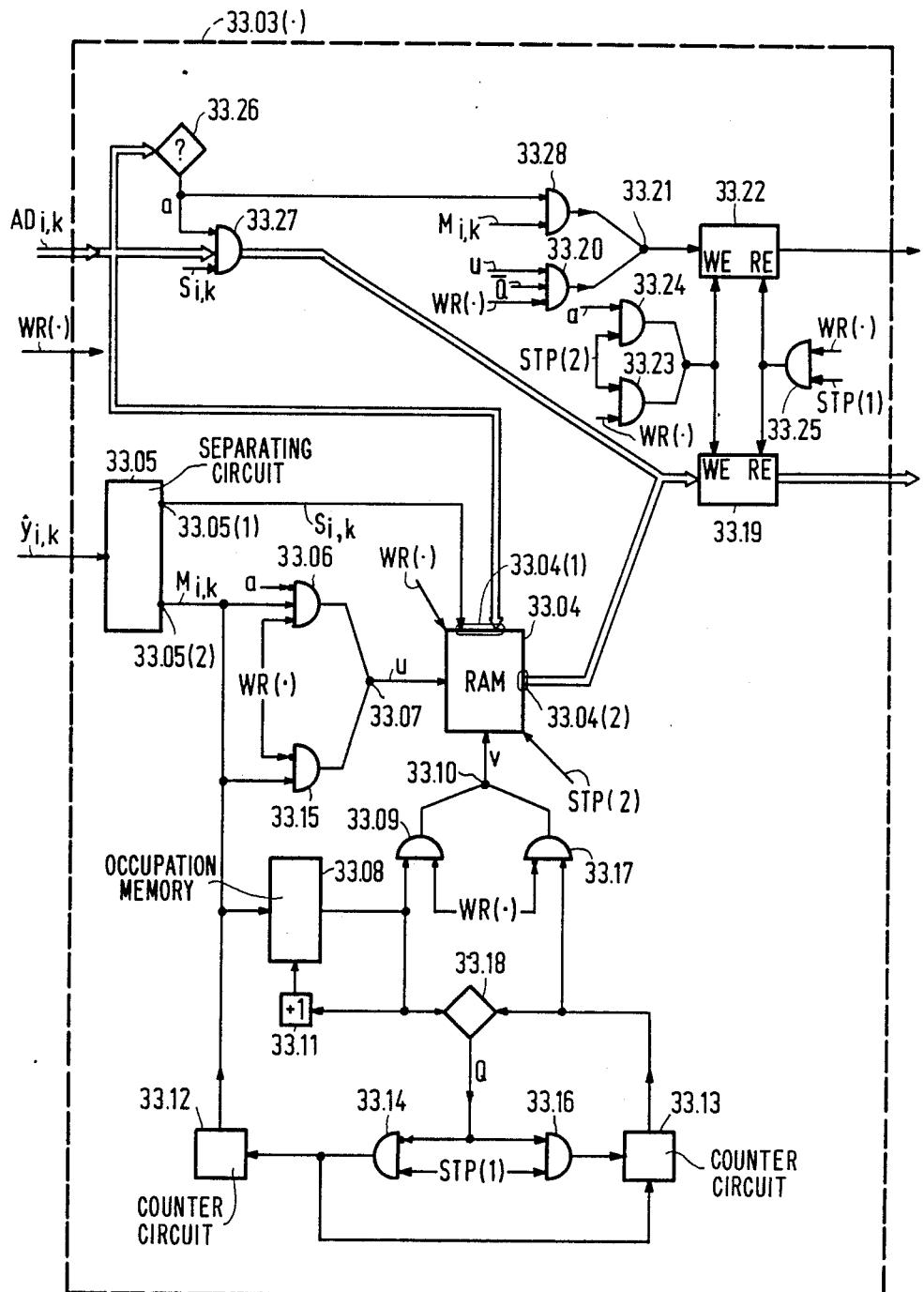
FIG. 10 shows an arranging circuit for use in the arranging circuit of FIG. 9.

The arranging circuit 33 may also have many forms. A very suitable embodiment is shown in FIGS. 9 and 10 for the sake of completeness. More particularly FIG. 9 shows the overall structure of the arranging circuit constituted by two arranging circuits 33.03(.) each receiving the quantizing coefficients $\hat{y}_{i,k}$ and the associated address words $AD_{i,k}$. Each of these arranging circuits applies the quantized AC coefficients different from zero in their order of decreasing magnitude to the output 33.01 and applies the associated address words to the output 33.02. Under the control of the write/read commands WR(3) and WR(4) the operation of this arranging circuit is now such that the arranging circuit 33.03(1) receives and processes the quantized coefficients of the coefficient array in memory 25(1) (see FIG. 2), while simultaneously the arranging circuit 33.03(2) applies the quantized AC coefficients of the coefficient array stored in memory 25(2) in its order of decreasing magnitude to the output 33.02.

An embodiment of the arranging circuits is shown in FIG. 10. As has been stated, the arranging circuit 33.03(.) receives the quantized coefficients $\hat{y}_{i,k}$, the associated address words $AD_{i,k}$ and the write/read command WR(.). It will hereinafter be assumed that each coefficient is given in a sign and magnitude representation and thus consists of a sign bit $S_{i,k}$ and a number of magnitude bits together forming a magnitude word $M_{i,k}$. It will also be assumed that the number of magnitude bits is equal to four so that the magnitude word can assume one of sixteen values. These values will be denoted by A, B, C, ..., M, N, O, P. A is the smallest value and P is the largest value.

The central part of this arranging circuit is constituted by a memory 33.04 in the form of a RAM. It is subdivided into sixteen memory fields whose ordinal numbers are progressively enumerated A, B, C, ..., M, N, O, P. Each memory field has a number of memory locations. These will be denoted by A(0), A(1), A(2), ... for the memory field A, B(0), B(1), B(2), ... for the memory field B, etc. For addressing a memory field the memory receives a field address word U which may have one of the values A to P inclusive and for addressing a memory location within an addressed field the memory receives a location address word V which may thus have one of the values 0, 1, 2, 3, .... This memory also has a data input 33.04(1) via which data words can be applied to the memory, and a data output 33.04(2). Each data word consists of the sign bit $S_{i,k}$ and the address word $AD_{i,k}$ of a received quantized coefficient $\hat{y}_{i,k}$. The memory is controlled by the write/read command WR(.) in such a way that firstly the memory is erased when this command assumes the logic value "1" and subsequently data words applied to the data input 33.04(1) are written in memory locations during the time when WR(.)=1. A data word is written in a memory location at the instant of occurrence of a control pulse STP(2) at the sampling frequency $f_s$. It is to be noted that WR(.)=1 will be referred to as the write state of the arranging circuit and WR(.)=0 will be referred to as the read state.

. In the write state of the arranging circuit the field address U are equal to the magnitude words $M_{i,k}$ of the AC coefficients. To this end the quantized coefficients $\hat{y}_{i,k}$ are applied to a separating circuit 33.05 which supplies for each coefficient $\hat{y}_{i,k}$ the sign bit $S_{i,k}$ at an output 33.05(1) and which supplies the magnitude word $M_{i,k}$ at an output 33.05(2). This magnitude word is also applied to an AND-gate circuit 33.06 which passes only the magnitude words of the AC coefficient to a wired OR-gate circuit 33.07 which supplies the field address word U. AND-gate circuit 33.06 not only receives the write/read command WR(.) for this purpose but also a logic signal a via an inverting input, which signal has the value "1" when the received coefficient is the DC coefficient $\hat{y}_{0,0}$ with address word $AD_{0,0}=1$. If an AC coefficient $\hat{y}_{i,k}$ with a magnitude $M_{i,k}=H$ is applied to the separating circuit 33.05, the memory field H is addressed. If it is the first time that this memory field H is addressed for the relevant coefficient array, the location address word V has the value 0 and the data word ($S_{i,k}$, $AD_{i,k}$) associated with this coefficient will be stored in memory location H(0). If the separating circuit receives a coefficient $\hat{y}_{i,k}$ with a magnitude H for the second time during scanning of the coefficient array, the memory field H is addressed again, but the associated data word is now stored in memory location H(1) because the location address word V will now assume the value 1. These location address words are supplied by an occupation memory 33.08 which is also in the form of a RAM and is now also addressed by the magnitude words $M_{i,k}$. It comprises as many memory locations as the RAM 33.04 has memory fields and these memory locations are enumerated A' to P' similarly as for the memory fields. A memory location of the occupation memory 33.08, for example H', comprises a number which indicates how many coefficients of a coefficient array already received by the arranging circuit had the magnitude H. This number will hereinafter be referred to as occupation number. If more particularly a magnitude word of, for example the value H occurs at the output 33.05(2) of the separating circuit, the memory field H of memory 33.04 is addressed and the memory location H' of occupation memory 33.08 is addressed. The occupation number stored in this memory location H' is then applied as a location address V to the memory 33.04 via an AND-gate circuit 33.09 and a wired OR-gate circuit 33.10. This occupation number is also raised by one unit in an adder circuit 33.11 and the incremented occupation number thus obtained is stored in the memory location H'. It is to be noted that this occupation memory 33.08 is erased in the same manner by the write/read command WR(.) as the memory 33.04.

After the associated data words ($S_{i,k}$, $AD_{i,k}$) of all AC coefficients are thus arranged in the RAM 33.04, the arranging circuit reaches its read state so that the contents of the RAM can be read. The address words required for this purpose are now supplied by two counter circuits 33.12 and 33.13. Counter circuit 33.12 is a modulo-15-downcounter which receives counting pulses STP(1) via an AND-gate 33.14, which pulses occur at the sampling frequency $f_s$ and which circuit successively assumes the counts P, O, N, M, ..., D, C, B. The actual count of counter circuit 33.12 is applied as a field address word via AND-gate circuit 33.15 to memory 33.04 and addresses a memory field in this memory. It is also applied to occupation memory 33.08 and addresses the memory location in this memory in which the occupation number is stored which indicates how many data words ($S_{i,k}$, $AD_{i,k}$) are present in the addressed memory field. Counter circuit 33.13 is a resettable counter which receives also the counting pulses STP(1) via an AND-gate 33.16 and which is each time reset by a counting pulse at the output of AND-gate 33.14. It can assume the counts 0, 1, 2, 3, .... The actual count of this counter circuit 33.13 is applied as a location address word to memory 33.04 via an AND-gate circuit 33.17 and OR-gate circuit 33.10. This actual count of counter circuit 33.13 is compared via a comparison circuit 33.18 with the occupation number of the actually addressed memory field. This comparison circuit 33.18 supplies a logic signal Q which has the logic value "1" as long as count and occupation number are not equal to each other. Consequently AND-gate 33.16, which also receives this signal Q, conducts and counter circuit 33.13 receives further counting pulses. As soon as count and occupation number are equal to each other, Q=0 so that counter circuit 33.13 receives no further counting pulses, but since the signal Q is also applied to an inverting input of AND-gate 33.14, counter circuit 33.12 now receives a counting pulse and counter circuit 33.13 is reset. In this way the memory fields of memory 33.04 are addressed in their order of decreasing ordinal number and all data words stored in such a memory field are read. These data words are applied to a FIFO memory 33.19.

The counts supplied by the counter circuit 33.12 address the different memory fields of RAM 33.04 and thus represent the magnitudes of the different coefficients, similarly as the magnitude words $M_{i,k}$. Since not only an address in the coefficient array and a sign bit of a coefficient but also its magnitude must be transmitted to the receiver, the address words U are applied together with the logic signal Q supplied by the comparison circuit 33.18 to an AND-gate circuit 33.20 whose output is connected via a wired OR-gate circuit 33.21 to the data input of a second FIFO memory 33.22. In this way those counts of counter circuit 33.12 which correspond to memory fields in which a number of data words are stored are written in this second FIFO memory for an equal number of times. More particularly, write enable pulses STP(2) are applied to the write enable inputs WE of the two FIFO memories, either via an AND-gate 33.23 which also receives the write/read command WR(.) via an inverting input, or via and AND-gate 33.24 which also receives the previously mentioned logic signal a. It is to be noted that these write enable pulses occur at the sampling frequency $f_s$.

With the arranging circuit described so far the AC coefficients are arranged in their order of decreasing magnitude. However, the quantizing circuit 32 (see FIG. 7) also supplies a DC coefficient. This will be dealt with separately. It will be assumed that the address of this DC coefficient is one; in other words $AD_{0,0}=1$. As is shown in FIG. 10 the address words $AD_{i,k}$ are applied to a comparison circuit 33.26 which supplies the previously mentioned logic signal a. This signal has the value "1" when the received address word has the value one and in all other cases this signal a has the value zero. If a=1, the relevant address word $AD_{0,0}$ is written in FIFO memory 33.19 together with the sign bit $S_{0,0}$ of the quantized coefficient $\hat{y}_{0,0}$ via an AND-gate circuit 33.27. Simultaneously the corresponding magnitude word $M_{0,0}$ is written in FIFO memory 33.22 via an AND-gate circuit 33.28 and wired OR-gate circuit 33.21.

If in this way two FIFO memories 33.19 and 33.22 comprise all sign bits and address words and all magnitude words of the quantized coefficients of an array different from A (zero), the read enable inputs RE of these registers receive the counting pulses STP(1) via an AND-gate 33.25 so that the data stored in the memories are read in the rhythm of the sampling pulses.

THE DECODING CIRCUIT 5

Figure 11:
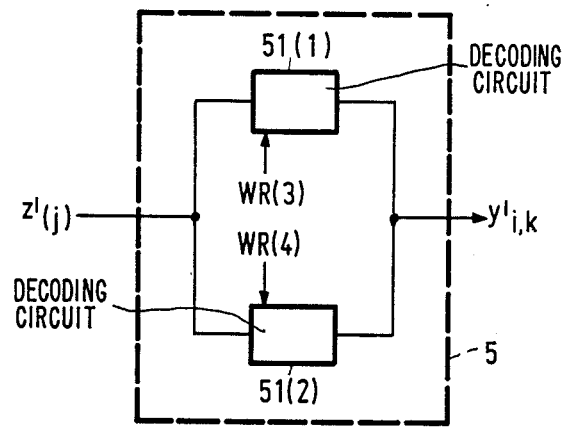
FIG. 11 shows a decoding circuit for use in the television system of FIG. 1.

The general structure of the decoding circuit 5 of FIG. 1 is shown in FIG. 11. It is constituted by two parallel-arranged decoding circuits 51(1) and 51(2) each receiving the received transmission words z'(j). Decoding circuit 51(.) is controlled by the logic write/read commands WR(.) and they are thus alternately in the write and read state in the sense that the decoding circuit 51(1) is in the read state when the decoding circuit 51(2) is in the write state, and conversely.

Figure 12:
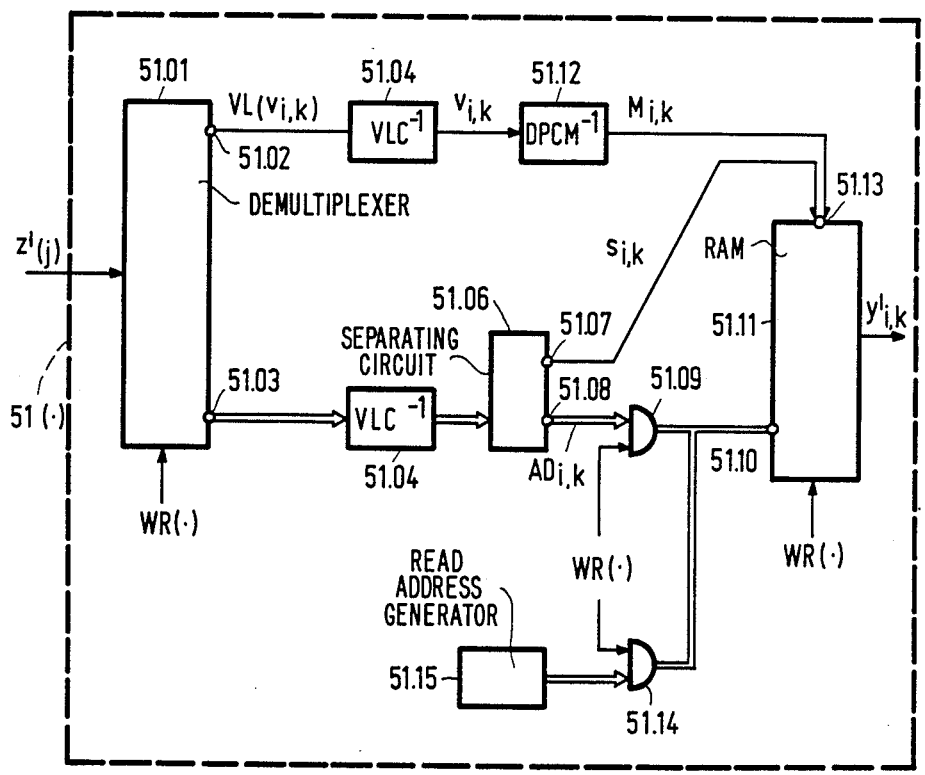
FIG. 12 shows a decoding circuit for use in the decoding circuit of FIG. 11.

Each decoding circuit may be formed in the way as shown in FIG. 12. More particularly this decoding circuit comprises a demultiplexer 51.01 which receives the transmission words z'(j) and if the decoding circuit is in the write state, it supplies the variable length difference coefficients $VL(v_{i,k})$ of all transmission words located between two EOB words to an output 51.02 and supplies the variable length address words $VL(S_{i,k}, AD_{i,k})$ to an output 51.03. The variable length difference coefficients $VL(v_{i,k})$ are applied to a variable length decoder 51.04 which supplies the original difference coefficients $v_{i,k}$. In a corresponding manner a variable length decoder 51.05 supplies the original sign bits and address words $S_{i,k}$ and $AD_{i,k}$, respectively, in response to the variable length address words applied thereto. They are in their turn applied to a separating circuit 51.06 which separates sign bit and address word and supplies them to outputs 51.07 and 51.08, respectively. The address words $AD_{i,k}$ are applied as write addresses via an AND-gate circuit 51.09 to the address input 51.10 of a memory 51.11, for example a RAM. The difference coefficients $v_{i,k}$ are applied to a differential decoding circuit 51.12 in the form of an accumulator circuit which supplies the original magnitude words $M_{i,k}$. Each magnitude word $M_{i,k}$ thus obtained is applied with its associated sign bit $S_{i,k}$ to the data input 51.13 of the RAM 51.11 and stored in the memory location which is addressed by the address word $AD_{i,k}$. If all transmission words between the two successive EOB words are processed, the decoding circuit acquires the read state. Then the address input 51.10 of RAM 51.11 receives read addresses via an AND-gate circuit 51.14 from a read address generator 51.15 so that the RAM is read in the correct order and thus supplies the coefficients $y'_{i,k}$. It is to be noted that the memory 51.11 is erased when the write/read command WR(.) changes from the value "0" to the value "1" and the decoding circuit thus acquires the write state.

What is claimed is:

1. A television transmission system for transmitting a picture represented by a digital picture signal from an encoding station to a decoding station, the encoding station comprising means to divide the picture into sub-pictures of N×N picture elements each, a picture transform circuit for performing a two-dimensional forward transform on each sub-picture to be converted into a coefficient array of N×N coefficients comprising one DC coefficient and (N×N)−1 AC coefficients, means to arrange the coefficients of a coefficient array for generating a coefficient series within which the magnitude variation of the AC coefficients is monotonous, the decoding station comprising means to compose a local coefficient array comprising N×N local coefficients from each received series of coefficients and a coefficient transform circuit for performing a two-dimensional inverse transform on the local coefficient array for genertnig a local sub-picture comprising N×N local picture elements, characterized in that the encoding station also comprises a differential encoding circuit which receives the AC coefficients of the series arranged monotonously in magnitude, subjects them to a differential encoding for converting the AC coefficients into difference coefficients to be transmitted to the decoding station which in its turn also comprises a differential decoding circuit which receives the transmitted difference coefficients of a series and converts them into local AC coefficients which correspond to the original AC coefficients of the coefficient array, and means to apply the local AC coefficients thus obtained to the composition means.

2. An encoding station suitable for use in a television transmission system as claimed in claim 1 for transmitting a picture represented by a digital picture signal to a decoding station and comprising means to divide the picture into sub-pictures of N×N picture elements each, a picture transform circuit for performing a two-dimensional forward transform on each sub-picture to be converted into a coefficient array of N×N coefficients comprising one DC coefficient and (N×N)−1 AC coefficients, means to arrange coefficients of a coefficient array for generating a coefficient series within which the magnitude variation of the AC coefficients is monotonous, characterized in that a differential encoding circuit is provided which receives the AC coefficients of the series monotonously arranged in magnitude and subjects them to a differential encoding for converting the AC coefficients into difference coefficients to be transmitted to the decoding station.

3. An encoding station as claimed in claim 2, characterized in that a variable length encoding circuit is provided which receives the difference coefficients and converts each coefficient into a variable length difference coefficient which is exclusively dependent on the magnitude the difference coefficient.

4. A decoding station suitable for use in a television transmission system as claimed in claim 1 and suitable for receiving difference coefficients supplied by an encoding station, comprising means to compose a local coefficient array comprising N×N local coefficients from each received series of coefficients and a coefficient transform circuit for performing a two-dimensional inverse transform on the local coefficient array for generating a local sub-picture comprising N×N local picture elements, characterized in that a differential decoding circuit is provided which receives the transmitted difference coefficients of a series and converts them into local AC coefficients which correspond to the original AC coefficients of the coefficient array, and means to apply the local AC coefficients thus obtained to the composition means.

5. A decoding station as claimed in claim 4, suitable for receiving variable length difference coefficients, characterized in that a variable length decoding circuit is provided which receives the variable length difference coefficients and converts each coefficient into a difference coefficient having a fixed length, said difference coefficient being exclusively dependent on the magnitude of the variable length difference coefficient.

* * * * *